No. 613,184. Patented Oct. 25, 1898.
J. B. ALLFREE.
ENGINE VALVE GEAR.
(Application filed Feb. 15, 1898.)
(No Model.) 6 Sheets—Sheet 1.

Fig 1.

Witnesses
William P. Mooney.
M. M. Depue.

Inventor
James B. Allfree.
By Attorney Thompson & Bell.

No. 613,184. Patented Oct. 25, 1898.
J. B. ALLFREE.
ENGINE VALVE GEAR.
(Application filed Feb. 15, 1898.)

(No Model.) 6 Sheets—Sheet 3.

Witnesses
William P. Mooney
U. U. Defier

Inventor
James B. Allfree
By Thompson R. Bee
Attorney.

UNITED STATES PATENT OFFICE.

JAMES B. ALLFREE, OF INDIANAPOLIS, INDIANA.

ENGINE VALVE-GEAR.

SPECIFICATION forming part of Letters Patent No. 613,184, dated October 25, 1898.

Application filed February 15, 1898. Serial No. 670,447. (No model.)

*To all whom it may concern:*

Be it known that I, JAMES B. ALLFREE, a citizen of the United States, residing at Indianapolis, in the county of Marion and State of Indiana, have invented new and useful Improvements in Engine Valve-Gears, of which the following is a specification.

My invention relates to certain new and useful improvements in valve-gear for steam or other motive-power engines employing expansive-fluid pressure, and in this specification and claims whenever I use the term "steam" I wish it understood that such term includes any expansive fluid, although my invention is especially applicable to steam-engines.

The objects of my invention are, first, to provide a valve-gear for such engines which will so control the movements of the valve that the conditions for the economical use of steam in a steam-engine may be more nearly fulfilled than by the use of any prior valve-gear, thus enabling the production of an indicator-card from such engine more nearly approaching the ideal card; second, to so construct such valve-gear that all the functions of admission, cut-off, and exhaust may be performed in the most efficient manner by a single valve, thereby dispensing with the complication incident to the use of two or more valves and their operating connections now commonly employed in automatic engines, such as the Corliss and other automatic engines of either high or low speed, and still preserving or increasing all the advantages of economy in fuel and steam pertaining to such engines; third, to so construct such valve-gear as to obtain the maximum work with maximum economy of steam consumption and to preserve or promote the simplicity of the automatic engine, while at the same time maintaining the economy of the multiple-valve or four-valve Corliss type without any material addition to first cost; fourth, to so construct the valve-gear that the parts shall operate with the highest efficiency and smoothness and be of the greatest durability, thus obviating frequent repair or renewal of parts.

In order to obtain these objects, I employ mechanism, preferably in addition to the main-valve gear, so constructed that it will modify or influence the movements of the main-valve gear to such an extent that the resultant movement will impart to the main valve or valves an intermittent or differential motion composed of four constituents—first, a rapid motion to open the admission-ports due to the accelerated motion of the valve at that time; second, a slower motion during the admission of steam until the point of cut-off is nearly reached; third, a quick motion for closing the valve and effecting cut-off, and, fourth, a motion that is retarded until there is a dwell or stop during the time of expansion or after the close of admission and before the close of exhaust during each stroke of the piston. These movements are duplicated for each stroke, so that the exhaust is likewise advantageously effected, and it is manifest that most desirable advantages are obtained, since the rapid opening for admission affords free admission of steam without wire-drawing, with resulting high initial pressure, and the rapid closing of the valve to cut off prevents wire-drawing and conduces to the best effects of expansion, while in exhausting the full benefits of expansion are preserved, as the steam is retained in the cylinder longer than usual and is quickly released due to the rapid opening of exhaust, and at the same time the exhaust is allowed to remain open longer than usual due to the retarded motion or dwell before the said exhaust is closed, thus avoiding undue compression and facilitating unusual freedom of exhaust. With these movements it will be observed that the valve is retarded in its travel until there is a dwell or stop at two points—viz., after the close of admission and before the close of exhaust—and that the movement is accelerated at the opening and closing of admission and exhaust.

I have shown in the drawings accompanying this specification the preferred forms of my improved valve-gear for accomplishing the result hereinbefore defined, and I will now describe in detail such constructions, referring to the drawings, in which the same or similar reference characters designate the same or similar parts in all the views.

Figure 1:
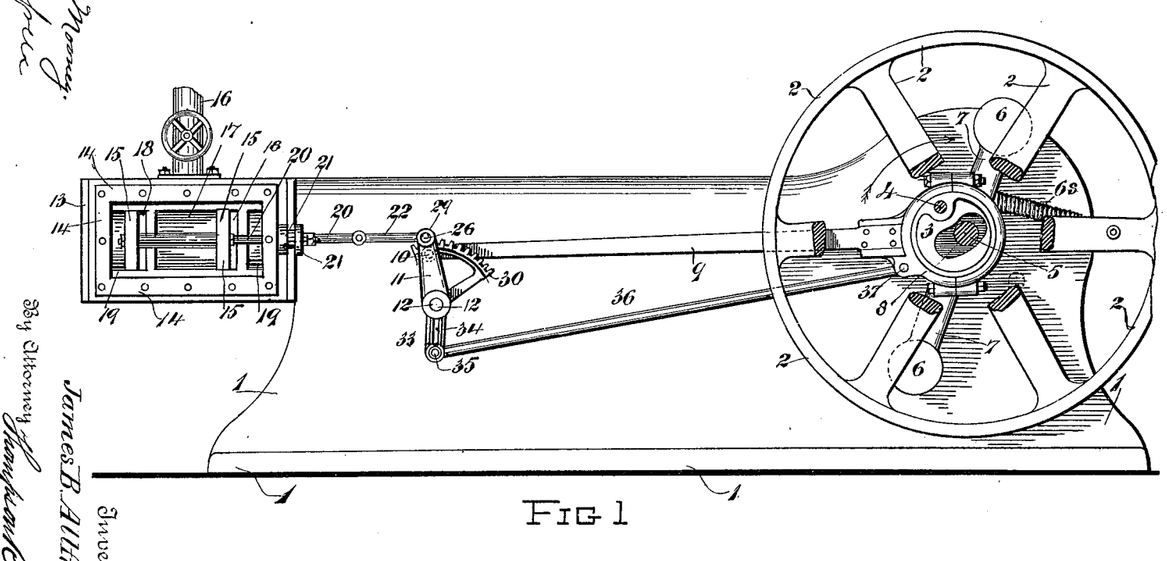
Figure 1 is a side elevation of a type of automatic engine, partly broken away, with my invention applied thereto, the cover of the steam-chest being removed.
Figures 2, 3:
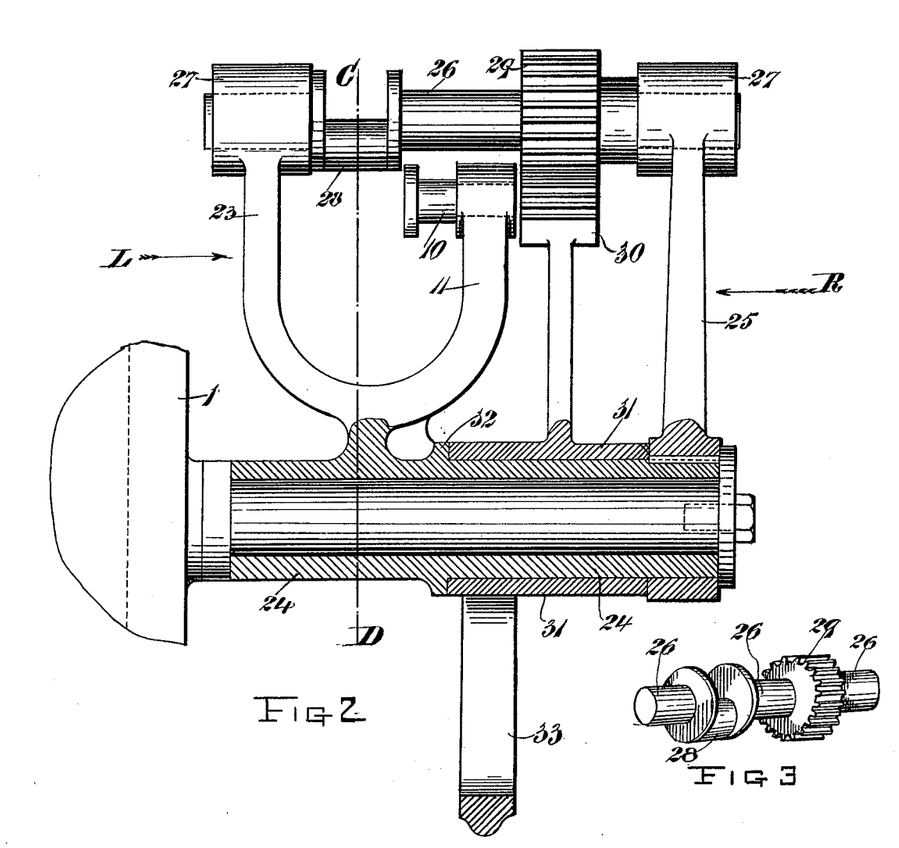
Fig. 2 is a sectional side view of my cut-off-valve gear on the line A B, Figs. 4 and 5.
Fig. 3 is a perspective view of the controlling or modifying eccentric shaft.
Figure 4:
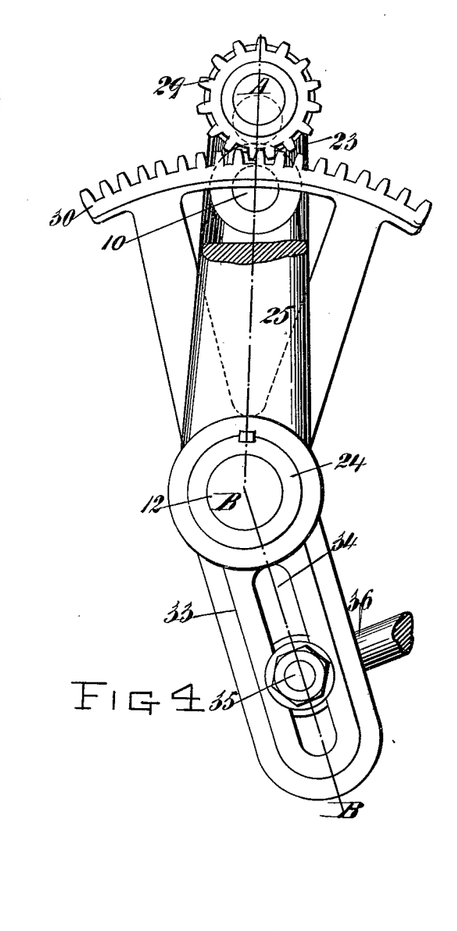
Fig. 4 is a broken front view of the controlling or modifying valve-gear, looking in the direction of the arrow R.
Figure 5:
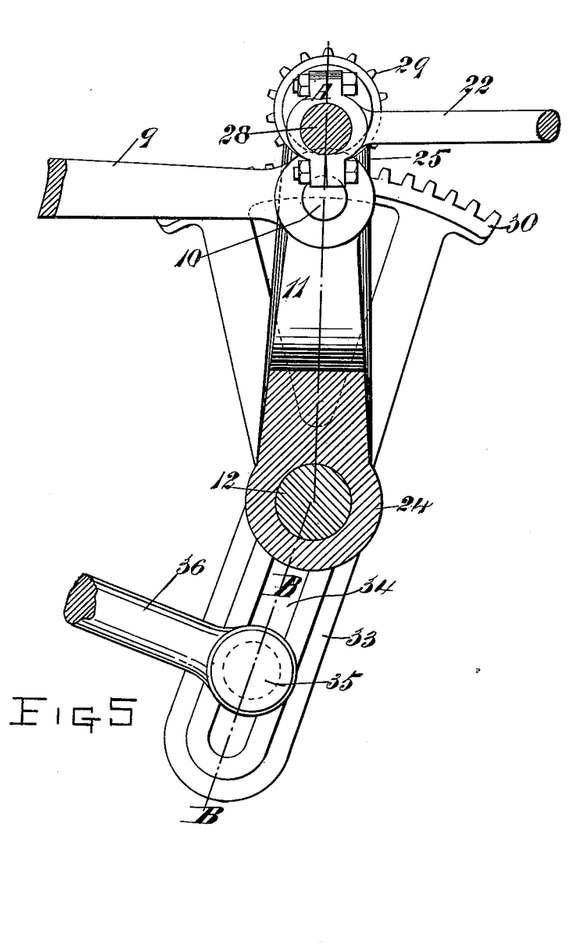
Fig. 5 is a broken rear sectional view of the same, taken through the line C D, looking in the direction of the arrow L.

In the drawings, referring particularly to Fig. 1, the numeral 1 indicates the frame, which may be of any suitable form and construction and adapted to the requirements of high-speed engines, in which frame is suitably journaled the crank-shaft 5, carrying the fly-wheel 2, to the hub of which wheel is pivotally secured the main eccentric 3 by means of the pivot-pin 4, or said pin may be carried by the main or crank shaft 5, if desired. The centrifugal or inertia weights 6 of the automatic governor are formed integral with the arms 7, which latter are either firmly secured to or are formed integral with the main eccentric 3, and 6$^s$ designates the counter-spring of the governor.

Mounted upon the eccentric 3 is an eccentric-strap 8, of any suitable construction, to which is secured an eccentric-rod 9, having its opposite end pivotally connected to a rocker-arm 11 by a wrist-pin 10, said rocker-arm being suitably journaled on the main frame 1, which frame also supports the cylinder 13 in any suitable manner. The cylinder is provided with the steam-chest 14, in which the slide-valve 15, preferably of the balanced type, reciprocates. The actuating fluid or steam is fed by a steam-supply pipe 16 into the chamber 17 of the steam-chest 14, whence it is distributed alternately through the ports 18 into the opposite end of said cylinder, whence after the performance of its function it is finally exhausted into the end or exhaust chambers 19, which latter connect with a suitable exhaust-pipe. The slide-valve 15 is connected by a suitable valve-rod 20, sliding longitudinally in the stuffing-box 21, to the valve-controlling mechanism by means of a connecting rod or link 22.

It will be readily understood that under the influence of the shifting eccentric-governor when the speed varies in the least degree from that to which the governor is set for normal speed the centrifugal or inertia weights will be caused to temporarily change their positions, thereby altering the throw of the main eccentric 3, thus either increasing or decreasing the supply of actuating fluid, according as the speed falls below or rises above the normal, such change in position of the eccentric remaining until the normal speed is restored and the weights have resumed their normal position. I do not, however, confine myself to the use of this form of governor or to a shifting eccentric or other form of variable gear or to any particular form of main-valve gear employing either fixed or movable eccentrics, as my invention is applicable to various other forms of valve mechanism as well.

Referring to Figs. 1 to 5, it will be seen that the rocker-arm 11, to which the shifting eccentric 3 is connected, projects from a sleeve 24, which is journaled on a pin extending outwardly from the frame of the engine, the outer end of which sleeve is reduced to form a seat on which an arm 25 is secured, said arm carrying a journal-bearing 27 for one end of the shaft 26, the other bearing for said shaft being supported by an arm 23, extending from the sleeve 24, both the arms 11 and 23 being rigid and preferably integral with the said sleeve. By this construction the eccentric 3 or other operating means imparts an oscillating or vibratory motion to the sleeve 24, and the latter motion will likewise be conveyed to the shaft 26, so that the said shaft, under the primary motion of the valve-gear, will have a motion of translation toward and from the valve-chest, and thus the operation of the governor-eccentric is communicated to the valve, which is connected to said shaft 26 by a link-rod 22, pivotally connected to the rod 20 of the valve.

In order to control and modify the motion of the valve derived from the primary eccentric to accomplish the results hereinbefore indicated, I interpose between said primary eccentric or valve motion another and additional valve-operating mechanism which in the present instance is in the form of an eccentric or crank pin. This eccentric 28 is preferably formed integral with the shaft 26 and is directly connected by a suitable strap and the link 22 to the valve-rod, and the motion imparted by the primary gear is controlled by the partial or complete revolution of the shaft 26 alternately in opposite directions, which alternate movements of said shaft are effected by a pinion 29, meshing with a segmental rack 30, carried by an arm on a sleeve 31, journaled on the sleeve 24 between a collar 32 on said latter sleeve and the hub or boss of the arm 25. The sleeve 31 is oscillated by the main eccentric through the medium of the eccentric-rod 36, which is connected to the strap 8 of the main eccentric by the pin 37 and to an arm 33 integral with or rigidly secured to the sleeve 31, and hence forming part of the rack 30, by means of a stud-pin 35, adjustably mounted in a slot on said arm 33. By moving the pin toward or from the center of oscillation the extent of vibration of the segmental rack 30 may be diminished or increased, as desired. It is obvious that a separate eccentric from the main eccentric may be used to give the vibratory motion to the rack 30, or any other suitable mechanism my be employed for this purpose, if desired. The eccentricity of the eccentric or crank pin 28 is determined by the conditions imposed, such as the amount of travel of the valve, the degree of acceleration required at the beginning and end of travel or stroke to effect the desired quick opening and closing, and the desired retardation for the expansion and for the free exhaust. With the construction thus described it will be seen that the sector or segmental rack will move in one direction, thus imparting through the pinion an oscillating motion to the shaft 26 simultaneous with its motion of translation, the motion of the shaft being at the greatest travel slightly more than and at the least travel slightly less than one revolution. When the eccentric 28 therefore is on either center, the valve will be in the position at the instant before admission, and hence the motion of the valve in opening will be that due to the rocker-arm increased by that due to the rotation of the shaft 26 in the same direction, thereby effecting a quick opening of the admission port, and the closing will be effected in the same manner and in the intermediate interval, during which the valve remains open for admission, the return movement of the eccentric-shaft 26 will be in progress, and hence the motion of the rocker-arm and the eccentric-shaft will be opposed, the closing of the port will be effected by the time the eccentric has reached the center again. During the next half-revolution of the eccentric-shaft 26 the motions of the shaft and the rocker-arm will be continually opposing each other until the retardation brings the valve to a pause or stop at the time the motions are equal and in opposite directions, which occurs just after the close of admission and before the close of the exhaust. These two motions are so timed that the valve is retarded until it stops at the point mentioned and its motion is accelerated, so as to close the exhaust quickly and likewise open and close admission quickly. These different movements may be more readily understood by reference to Figs. 6 to 10 of the drawings.

Figures 6, 7, 8:
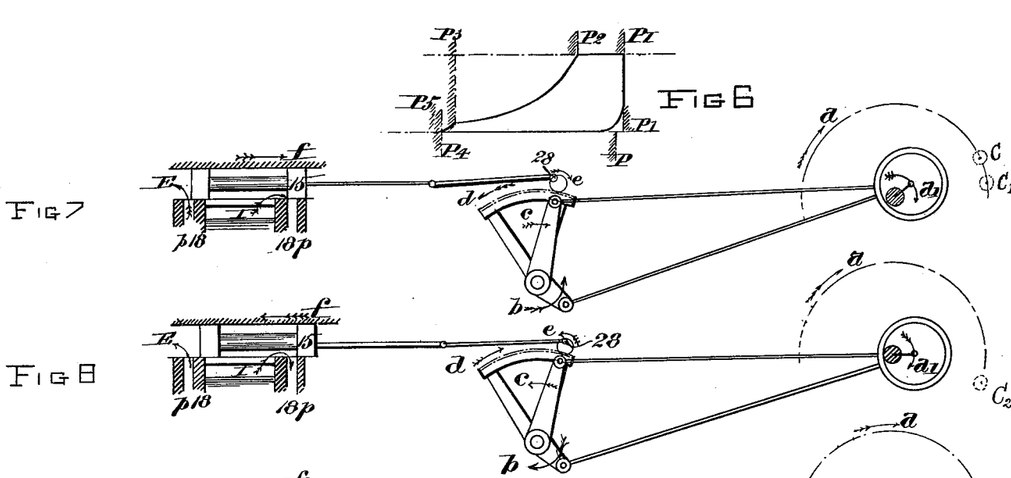
Fig. 6 is a facsimile of an indicator-diagram, taken from a high-speed engine equipped with my improved valve-gear.
Figs. 7, 8, 9, and 10 are diagram views showing the relative positions of the main valve and operating parts for different positions of the piston shown in Fig. 6.
Figures 9, 10:
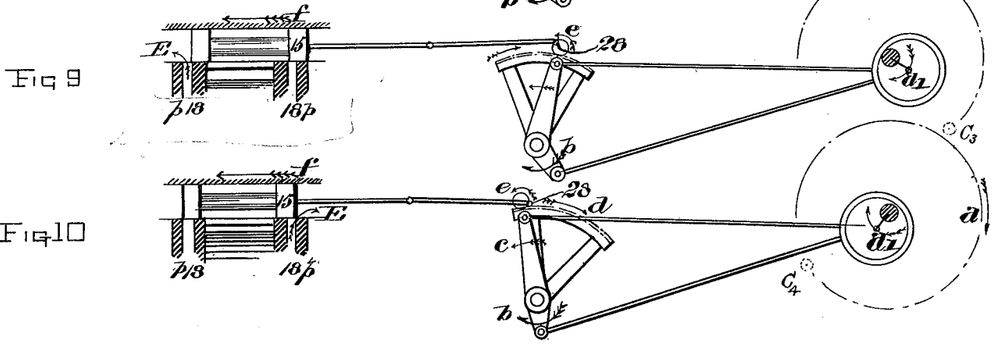

Diagram Fig. 7 represents the position of the crank corresponding with the position of the piston P, (shown in Fig. 6,) and when the crank is in this position the valve 15 will be "line on line" with the port edge—that is, at the instant before the opening of the port $18^p$ to admit the actuating fluid. The crank still moves in the direction of the arrow $a$ till it arrives at the position $C'$, during which period of rotation the piston P has reached the position $P'$ and the pressure of the actuating fluid in the cylinder of the engine has reached its maxium. The induction or admission port $18^p$ will now open to its full extent. It will be observed that while the crank C is moving from C to $C'$ the auxiliary or modifying eccentric pin 28 rotates in the direction of the arrow $e$, Fig. 7, which movement is in the same direction as the direction of travel of the main slide-valve 15, till the crank-pin C reaches the position $C^2$, Fig. 8, at which position the parts are practically at rest, the main eccentric 3 having reached its "dead-point" and the parts of the modifying gear are about to reverse their directions of motion, as indicated by the arrows in Fig. 8, the arrows $b$, $c$, and $d$ in all the views indicating the direction of oscillation of the rocking arm and segment, and the arrow E the direction of the flow of the fluid out of the port, and the arrow I the direction of the flow into the port. When the crank arrives at the position $C^3$, as shown in Fig. 9, the main slide-valve 15 has closed the port $18^p$, cutting off the actuating fluid for expansion, and the piston P has traversed to the position $P^2$, this movement for cut-off being quickly effected because the main and auxiliary or modifying eccentrics are still acting in the same direction. The direction of rotation of the auxiliary or modifying eccentric immediately after the close of admission-port shown in Fig. 10, as indicated by the arrow $e$, is opposed to the direction of movement of the main valve-operating eccentric, and hence the said auxiliary eccentric subtracts from the traversing movement of the main slide-valve the extent of the movement through the lower half of the rotation of said pin 28 about its axis, or that portion of the rotation of greatest travel of said pin relatively to the travel of the main valve, thereby reducing or retarding the rate of travel of the said valve 15. This retarding movement of the valve continues until the crank C has reached the position $C^4$, Fig. 10, at which position the piston P has arrived at the position $P^4$ under the expansive action of the actuating fluid nearing the end of its stroke, at which position the valve 15 begins to open the port $18^p$ to exhaust, as indicated by the arrow E. The crank C being further rotated till the piston reaches the position $P^5$ or the end of its stroke, the movement of the parts corresponding with the various positions of the crank C, the piston P will be operated in the order as shown in the diagram and preceding description, and so on, as the crank-shaft is rotated. It will be particularly observed that the most efficient quarters of the revolution of the modifying-eccentric pin 28 are directed to operate the slide-valve 15 and combine with the motion of the said valve, due to the primary valve-gear, to increase the rate of travel and, similarly, when said valve begins and continues the first portions of its travel, and the said modifying-eccentric pin operates in opposition to said primary gear to retard the travel of the same during the middle or central portion of its travel, so that the valve is brought to rest at two points in its travel—viz., after the closing of admission and before the closing of exhaust for each stroke of the piston. When the piston P is traveling from P² to P³, the main slide-valve 13 is traveling at its minimum or slower velocity of travel, or about one-half the rate of travel of the valve, if operated directly by the main eccentric, without control of the modifying-eccentric during this portion of its travel, when retarded movement of the main valve permits the free and unobstructed flow of exhaust of the steam from the cylinder of the engine, and while the piston P moves successively to the positions P P' the main valve 15 moves very rapidly—that is, about twice its rate of travel, if operated directly by the main eccentric 3, without control of the modifying-eccentric—and this acceleration continues until the valve has reached the position of full-port opening, as shown in Fig. 8, in which position the said main valve remains momentarily at rest till the movement of the eccentric 3 and the modifying-eccentric 28 are simultaneous and in the same direction to rapidly close the port with the same accelerated velocity as that of opening, as will be seen by comparing the diagrams 8 and 9 and observing the relative positions of the parts, and the rate of travel of the valve 15 at the ends of its travel—that is, at the opening and closing of the induction-ports—is about four times its rate of travel at its intermediate or retarded portion of the travel of said valve or the period of expansion and exhausting the actuating fluid.

Figure 11:
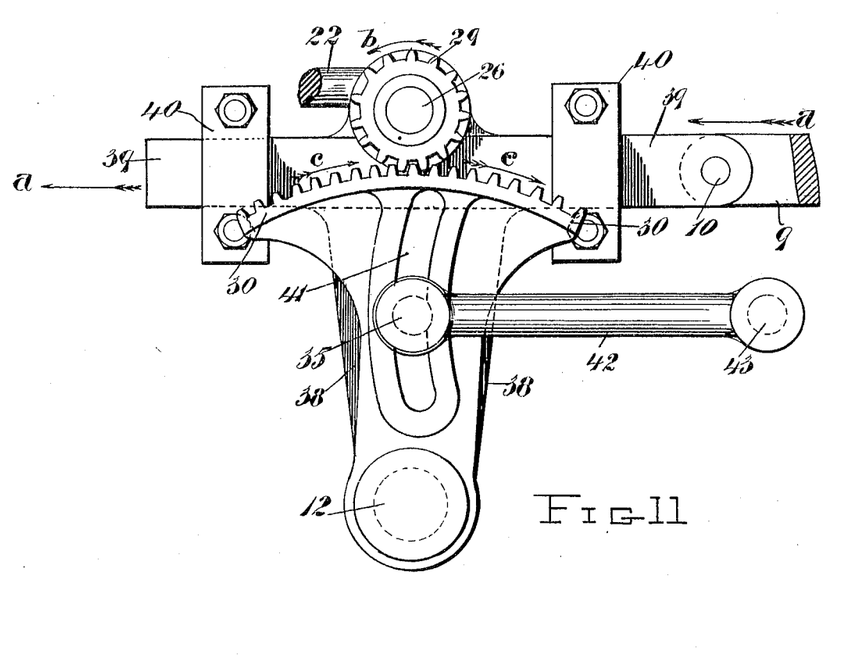
Fig. 11 is a view showing the application of my invention to a different type of valve-gear.
Figure 12:
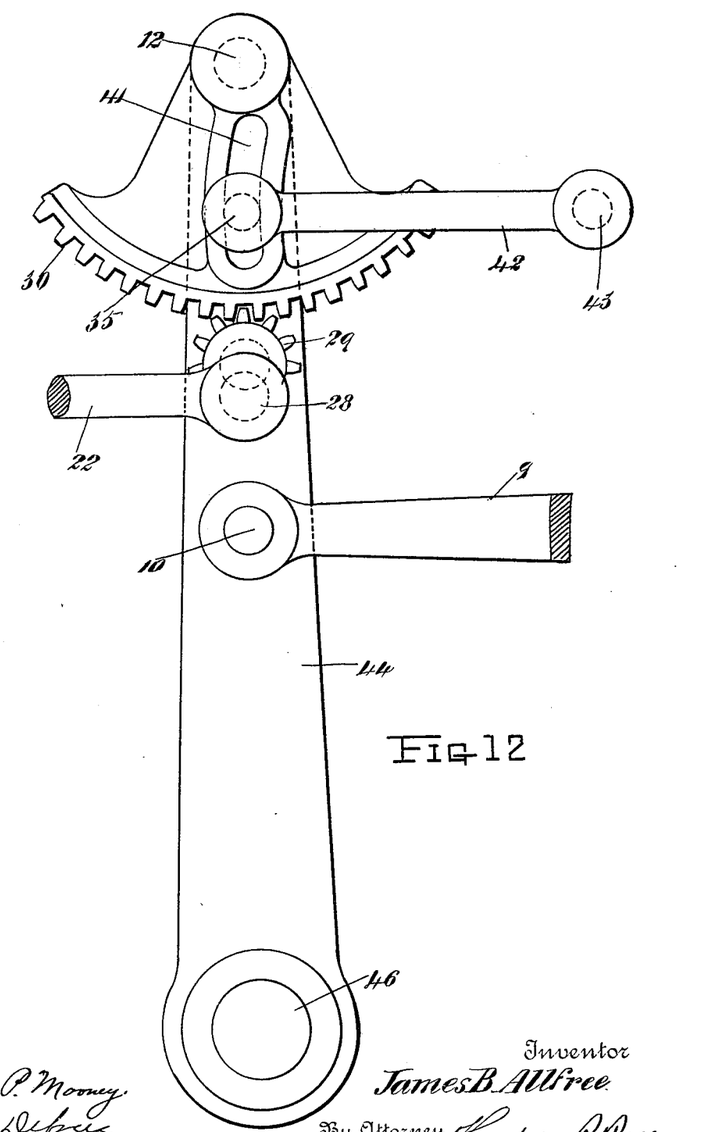
Fig. 12 is a modified form of the mechanism illustrated in Figs. 2 to 5, inclusive.

I do not confine myself to the particular means hereinbefore described whereby the modifying-eccentric or eccentric-pin shaft may be rotated to produce the desired result, as many other and various means may be employed to rotate the same without departing from the spirit of my invention, examples of which are shown in Figs. 11 and 12, in which, as before, 9 designates the main-eccentric rod; 22, the main valve-connecting rod; 26, the modifying-eccentric shaft; 29, the modifying-eccentric-shaft pinion, and 30 the sector or segmental rack, pivotally supported on the stud 12. In the form shown in Fig. 11 the stud 12 is secured to an arm 38, depending from the sliding bar or rod, which is adapted to slide or reciprocate longitudinally in its bearings 40, which latter may be either secured to or formed integral on the main frame 1 of the engine. A reciprocating movement is imparted to said bar or rod 39 by means of the eccentric 9, connected by a pin 10 to the end of the said bar or rod. A slot 41 is formed in the segment 30, in which the pin 35 is adjustably secured, and the retaining-link 42 is pivotally secured at one end to said pin 35 and at its opposite end to the fixed stud 43, which latter may be secured to the main frame 1 of the engine. It will be readily seen by observing the directions of motion indicated by the arrows $ab$, &c., how the parts operate, and the results to be derived from such motion are exactly similar to those obtained by the form already described, for as the eccentric 9 pushes or moves the sliding bar 39 in the direction of the arrow $a$ the segment 30 will oscillate on its stud 12, since the segment or sector will be restrained by the link 42 from moving said rod 39 as the latter reciprocates with its depending arm and stud 12, carried thereby, and hence the segment will operate upon the pinion 29, as in the construction already described.

Another modification of my invention is illustrated in Fig. 12, in which a rock-arm 44, pivoted on a stud-pin 46, is oscillated by the connecting-rod 9, connected to the main eccentric 3. In this form the segment 30 is pivotally supported by the pin 12 above the driven pinion 29, said pin 12 being firmly secured to the end of the said rocking lever 44. The other parts are so much alike and similar in their operation to their corresponding parts illustrated in Fig. 11 that further description of the operation of this form of the mechanism is unnecessary.

It will be understood that while I have shown my invention applied to a single valve, because in the majority of cases it is preferable to use a single valve for the reasons heretofore indicated, it is obvious that my improved gear may be applied to engines in which two or more valves are used to distribute the actuating fluid, as may be the case in engines of large horse-power; but in such cases it is only necessary to make suitable connections from the modifying device directly with such valves in a similar manner to the single connection shown in the drawings, and hence in the claims and in this description when I use the term "valve" I mean to include both a single distributing-valve and a series of such valves when the latter may be desirable for controlling the admission and exhaust of the actuating fluid, in which case, of course, the separate valves are smaller than the single valves would be for the same engine, reducing the clearance as much as possible, which in the single-valve structure is materially reduced as compared to the four-valve automatic engine.

It will also be understood that my improved valve-gear is applicable to other forms of valves than "slide-valves," as ordinarily termed, for it is obvious that it can be applied to any valve having an intermittent movement for controlling the admission and exhaust, such as oscillating intermittent rotary valves or the like. Furthermore, it is clear that while it is preferable to use my modifying-gear in combination with a primary gear my invention includes within its scope any valve-operating mechanism so arranged and disposed as to secure a motion that will be composed of the constituents hereinbefore specified, and especially such of those motions that cause a retardation of the travel of the valve until it either dwells or stops just after the close of admission and just before the close of exhaust during each stroke of the piston, and while the momentary stopping of the valve is preferable it is to be clearly understood that the spirit of my invention embraces both the dwell or delay and the stopping of the valve so long as such dwell or delay prevents effective movement of the valve just after the close of admission and before the close of exhaust, and therefore when the word "dwell" is used in this specification and claims its meaning is to be understood as including both a complete stop and a delay in the movement of the valve.

I claim as my invention—

1. In valve-gear for engines, the combination with a cylinder provided with ports for the admission and exhaust of actuating fluid, a valve controlling said ports, and a piston in said cylinder, of a primary valve-gear, connection between the piston and primary valve-gear for operating the said gear, a controlling or modifying device connected to the valve, and means for causing said controlling or modifying device to oppose the movement of the primary gear until the resultant retarded motion acting upon the valve causes the latter to dwell after the close of admission and before the close of exhaust during each stroke of the piston, substantially as described.

2. In a valve-gear for engines, the combination with a cylinder provided with admission and exhaust ports for the actuating fluid, a valve for controlling said ports and a piston in said cylinder, of a primary valve-gear, connections between the piston and primary gear for operating the same, a controlling or modifying eccentric device connected with the valve and connections between said eccentric device and primary gear, so disposed as to cause the eccentric device to oppose the movement of the primary gear until the resultant retarded motion imparted to the valve causes said valve to dwell after the close of admission and before the close of the exhaust during each stroke of the piston, substantially as described.

3. In valve-gear for engines, the combination with a cylinder provided with admission and exhaust ports for the actuating fluid, a valve for controlling said ports, and a piston in said cylinder, of a primary valve-gear, connections between said primary gear and the piston for operating said gear, an auxiliary eccentric carried by and moving with said primary gear and connected to the valve, and means for giving said eccentric a motion of rotation alternately in opposite directions, and so disposed as to compel the resultant motion of the opposing movement of the auxiliary eccentric to cause the valve to dwell after the close of admission and before the close of the exhaust during each stroke of the piston, substantially as described.

4. In valve-gear for engines, the combination with a cylinder provided with ports for admission and exhaust of the actuating fluid, a valve for controlling said ports, and a piston in said cylinder, a main eccentric operated by the movements of the piston, a rocker-arm connected to and operated by said eccentric, an auxiliary or modifying eccentric connected to said rocker-arm and to the valve, with means intermediate of said eccentric and auxiliary eccentric for causing the auxiliary eccentric to alternately act in conjunction with and oppose the motion of the main eccentric, whereby the valve is caused to move quickly in opening and closing the admission and exhaust, and move slowly until it dwells after the close of admission and before the close of exhaust, substantially as described.

5. In valve-gear for engines, the combination with a cylinder provided with suitable ports, a valve for controlling said ports, a piston and a shaft connected with the same, of a main eccentric on said shaft, a rocker-arm operated by said main eccentric, an auxiliary eccentric connected with the rocker-arm so as to vibrate therewith but free to rotate, in either direction, a segmental rack, and a pinion operated thereby and connected to the auxiliary eccentric, and a link connecting said auxiliary eccentric with the valve, whereby the rate of travel of the valve is alternately accelerated and retarded according as the main eccentric and auxiliary eccentric act in the same or opposite directions so that the valve is caused to dwell or stop just after the close of admission and just before the close of exhaust, substantially as described.

6. In valve-gear for engines, the combination with a cylinder provided with admission and exhaust ports, a valve for controlling said ports, a piston and a shaft operated therefrom, of a main eccentric on said shaft, a sleeve connected to the main eccentric and journaled on a fixed part of the engine, a rocker-arm extending from said sleeve, an auxiliary shaft journaled in bearings rigid with the sleeve, a segmental rack mounted to vibrate independently of the sleeve, connections between the main shaft and said rack for vibrating the same, an eccentric on the auxiliary shaft and directly connected to the valve, and a pinion fixed on said shaft and meshing with the rack, whereby the motions of the two eccentrics are alternately opposed and in the same direction so that the valve is caused to dwell or stop just after the close of admission and just before the close of exhaust, during each stroke of the piston, substantially as and for the purpose set forth.

7. In valve-gear for steam-engines, the combination with a distributing-valve, a modifying-eccentric, a rod connecting said eccentric and said main valve, of a rocker-arm, an eccentric-shaft carried by said rocker-arm, a pinion on said shaft, a segment pivoted on said rocker-arm and meshing with said pinion, and means for oscillating said rocker-arm and said segment, whereby the valve is caused to dwell or stop just after the close of admission and just before the close of exhaust, during each stroke of the piston.

8. In valve-gear for steam-engines, the combination with a distributing-valve, a modifying-eccentric, a rod connecting said eccentric to the valve, of a rocker-arm, a shaft on which the eccentric is mounted and carried by said rocker-arm, a pinion on said shaft, a segment pivoted on said rocker-arm and meshing with said pinion, and means for oscillating said rocker-arm and said segment in opposite directions, whereby the valve is caused to dwell just after the close of admission and just before the close of exhaust, during each stroke of the piston.

9. In a valve-gear for steam-engines, the combination with a distributing-valve, a main eccentric, a modifying-eccentric, and a rod connecting said valve and said modifying-eccentric, of a rocker-arm, a shaft on which the eccentric is mounted carried by said rocker-arm, a pinion on said shaft, a segmental rack pivoted on the rocker-arm, and meshing with said pinion, and suitable connecting-rods connecting said rocker-arm and said segment to the main eccentric to oscillate said rocker-arm and said segment simultaneously in opposing directions, whereby the valve is caused to dwell or stop just after the close of admission and just before the close of exhaust, during each stroke of the piston, substantially as set forth.

10. In valve-gear for engines, the combination with a cylinder provided with ports for the admission and exhaust of actuating fluid, a piston in said cylinder, and a valve controlling said ports, of a valve-operating mechanism connected to the valve, and connections between said valve-operating mechanism and the piston, said valve-operating mechanism and connections being so disposed and timed with respect to the movements of the piston that a differential movement is imparted to the valve comprising quick motions to open and close the admission and exhaust and motions retarded until the valve is caused to dwell or stop just after the close of admission and before the close of exhaust, all during each stroke of the piston.

In testimony whereof I have hereunto set my hand in the presence of two subscribing witnesses.

JAMES B. ALLFREE.

Witnesses:
THOMPSON R. BELL,
EDGAR B. HETZEL.